United States Patent [19]

Trojer et al.

[11] 4,231,776
[45] Nov. 4, 1980

[54] METHOD FOR MANUFACTURING A PANEL OF ANISOTROPIC CERAMIC GLASS

[75] Inventors: Felix Trojer, Lancy; John Briggs, Onex, both of Switzerland

[73] Assignee: Battelle Memorial Institute, Geneva, Switzerland

[21] Appl. No.: 917,196

[22] Filed: Jun. 20, 1978

Related U.S. Application Data

[63] Continuation of Ser. No. 707,756, Jul. 22, 1976, abandoned.

[30] Foreign Application Priority Data

Jul. 22, 1975 [CH] Switzerland ............... 9557/75

[51] Int. Cl.³ .............................................. C03B 27/02
[52] U.S. Cl. ........................................ 65/33; 23/296; 65/29
[58] Field of Search ............ 65/33, 60 C, 92, 95, 65/29; 106/39.8, 39.6; 23/300, 295, 296

[56] References Cited

U.S. PATENT DOCUMENTS

| | | | |
|---|---|---|---|
| 3,382,047 | 5/1968 | Holtzberg et al. | 65/33 X |
| 3,464,807 | 9/1969 | Pressau | 65/33 |
| 3,514,265 | 5/1970 | Pastore | 65/33 X |
| 3,544,293 | 12/1970 | Riebling | 23/295 X |
| 3,758,705 | 9/1973 | Schmid | 23/300 X |
| 3,795,488 | 3/1974 | Oliver | 65/33 X |
| 3,809,543 | 5/1974 | Gaskell et al. | 65/33 |
| 3,901,719 | 8/1975 | Brydges | 65/33 X |
| 3,938,977 | 2/1976 | Gliemeroth | 65/33 X |

Primary Examiner—Kenneth M. Schor
Attorney, Agent, or Firm—Robert E. Burns; Emmanuel J. Lobato; Bruce L. Adams

[57] ABSTRACT

A method for manufacturing a panel of anisotropic ceramic glass comprising acicular crystals enclosed in a vitreous matrix, the crystals being orientated perpendicularly to the panel faces and traversing the panel from one side to the other, in which a homogeneous mineral composition capable of forming a ceramic glass is subjected to heat treatment consisting of bringing said layer to a temperature at least equal to its working temperature and greater than the crystallization temperature of the crystalline phase, and establishing therein a thermal gradient perpendicular to its faces, and then progressively and gradually lowering the temperature of the layer starting from one of its faces, in such a manner as to successively bring each transverse plane of the layer to a temperature lower than the crystallization range of the crystalline phase, so as to induce nucleation of the crystalline phase in that face plane which is at the lowest temperature while maintaining the thermal gradient such as to orientate the direction of maximum growth of the crystals perpendicular to the faces of the layer is characterized in that the heat treatment is carried out by placing the layer of vitreous composition on the surface of a fused metal bath the lower face of the layer of vitreous composition in contact with the bath surface being at a higher temperature than the upper free face of the layer, and simultaneously controlling the temperature of the two faces of said layer to maintain a constant thermal gradient.

2 Claims, 9 Drawing Figures

33x

33x

33x

33x

33x

33x

METHOD FOR MANUFACTURING A PANEL OF ANISOTROPIC CERAMIC GLASS

This is a continuation of application Ser. No. 707,756, filed July 22, 1976, now abandoned.

This invention relates to a method for manufacturing a panel of anisotropic ceramic glass comprising acicular crystals enclosed in a vitreous matrix, the crystals being orientated perpendicular to the panel faces and traversing the panel from one side to the other.

In this method a homogeneous mineral composition capable of forming a ceramic glass is prepared from a mixture of mineral oxides and/or mineral compounds capable of generating such oxides, and a homogeneous layer of this composition in the vitreous state and of the shape and dimensions of the panel to be obtained is subjected to heat treatment consisting of bringing said layer to a temperature at least equal to its working temperature and greater than the crystallization temperature of the crystalline phase, and establishing therein a thermal gradient perpendicular to its faces, and then progressively and gradually lowering the temperature of the layer starting from one of its faces, in such a manner as to successively bring each transverse plane of the layer to a temperature lower than the crystallization range of the crystalline phase, so as to induce nucleation of the crystalline phase in that face plane which is at the lowest temperature followed by the growth of acicular crystals in said phase in the direction of the opposite face, while maintaining the thermal gradient such as to orientate the direction of maximum growth of the crystals perpendicular to the faces of the layer.

Depending on the nature of the crystals, the values of certain physical properties of the panel obtained by this method, such as its electrical or thermal conductivity, its magnetic susceptibility, its dielectric constant, its electro-optical and piezoelectric properties, etc. may be much higher in the direction perpendicular to its faces than in the direction parallel thereto.

This anisotropy may be utilised in various fields of applications of such a panel, notably in the manufacture of devices and apparatus which allow the visualisation and/or recording, in the form of an image, of information supplied in the form of electrical or magnetic signals, and in the manufacture of "memory" devices, designed for example for incorporation in electronic calculators, or in the manufacture of optical devices such as polarising filters or screens.

Anisotropic glass panels of this type are already known, as is their use as screens for cathode ray tubes, with the property of allowing the image formed by such a tube to be visualised and registered electrostatically on a suitable support.

One method for manufacturing these panels consists of mechanically assembling elements of different materials, such as metal needles or fibres and insulating glass. However, given that one of the main qualities which such panels must possess is a structural fineness sufficient to enable images formed by cathode ray tubes to be reproduced without loss of image definition, the conducting elements of the panels must be of very small diameter. It can therefore easily be conceived that their manufacture by this method is very difficult if not impossible to operate industrially.

U.S. Pat. No. 3,758,705 (Anthony P. Schmid) describes a process for manufacturing a glass panel comprising a large number of electrically conducting filiform crystals oriented perpendicularly to the faces of the panel and traversing this latter from one side to the other, the crystals being insulated one from the other by a non-conducting vitreous matrix.

This method consists of inducing nucleation of filiform crystals of reduced rutile, $Ti_xO_{2x-1}$, in a transverse plane of a mass of fused glass with the property of being able to be converted into a ceramic glass by the effect of appropriate heat treatment, the nucleation being triggered off by cooling the glass mass in the said plane to a convenient temperature, then making the crystals grow in this mass by gradually cooling adjacent transverse planes while maintaining a unidirectional thermal gradient parallel to the desired direction of growth of the crystals.

According to the U.S. Pat. No. 3,758,705, the mass of fused glass is placed in a refractory crucible, and nucleation of the rutile crystals is triggered off at the bottom of the mass by cooling the base of the crucible by a gas stream at ambient temperature. A vertical thermal gradient is thus created between the bottom of the glass mass and its upper free surface. Crystallization of the rutile crystals is obtained while continuing to direct the gas stream onto the bottom of the crucible, so as to cause progressive cooling of the glass mass starting from the bottom.

To obtain elongated crystals constantly orientated perpendicularly to the faces of the glass panel and of regular structure from one to the other panel face, a constant cooling speed must be maintained appropriate to the speed of growth of the crystals, requiring the thermal gradient to be likewise maintained as constant as possible during the entire growth period.

The cooling method described in U.S. Pat. No. 3,758,705 (gas stream directed onto the bottom of the crucible containing the fused homogeneous glass mass and, possibly, also on the upper free surface of the mass) is not very suitable for optimum adjustment of the cooling speed or for maintaining a constant thermal gradient during crystal growth.

In particular, according to the manner of operation of the method described in Example 2 of the patent, the temperature of the bottom of the glass mass is firstly lowered below the lower limit of the crystallization range of the crystalline phase starting from a temperature above this range, while maintaining the temperature of the top of the glass mass constant. The temperature of the top of the glass mass is then likewise lowered below the lower limit of the crystallization range of the crystalline phase while maintaining the temperature of the bottom of the mass constant.

Thus the thermal gradient between the top and bottom of the glass mass does not remain constant during crystallization of the crystalline phase, but increases during the first afore-mentioned period and then decreases, so that at the end of crystallization it has almost returned to its original value.

The object of the present invention is to provide an improvement to this method which allows better adjustment of the crystal growth conditions from one panel face to the other, in particular by maintaining the thermal gradient at a constant value during the entire duration of this growth, with a view to obtaining crystals of very regular structure and of good parallelism over their entire length.

A further object of the invention is to ensure good reproducibility of the characteristics of the panel obtained by the method. To this end, the method according to the invention is characterised in that the heat treatment is carried out by placing the layer of vitreous composition on the surface of a fused metal bath consisting of a metal or alloy of melting point lower than the melting point of the glass, the lower face of the layer of vitreous composition in contact with the bath surface being at a higher temperature than the upper free face of the layer, and simultaneously controlling the temperature of the two faces of said layer in such a manner as to maintain the thermal gradient at an essentially constant and sufficiently high value throughout the entire duration of growth of the crystalline phase such that the direction of maximum growth of the crystals thus formed is perpendicular to the faces of the panel throughout the whole thickness thereof.

Tin is preferably used as the metal forming the metal bath. A tin alloy may equally be used advantageously.

Any appropriate mixture may be used as the mixture of mineral oxides and/or mineral compounds capable of generating such oxides, which is able to form a homogeneous composition on melting, which may be solidified at will either in the form of a homogeneous glass or in the form of a ceramic glass.

Various mixtures of this type have already been described in publications. A homogeneous molten mass may be obtained by bringing one of these mixtures to a temperature sufficient to melt it completely and then maintaining it at such a temperature for a period of time sufficiently long (generally several hours) for it to homogenise. Such a mass solidifies in the form of a ceramic glass if its temperature is lowered so slowly that nucleation and crystal growth are able to take place before its viscosity becomes too high, as a result of solidification, to prevent crystallization phenomena.

In general, a cooling speed of the order of a few degrees per minute over the temperature range in the neighborhood of its crystallzation temperature (approximately 900° to 1200° C.) is suitable to obtain solidification in the form of ceramic glass.

In contrast, if the temperature of the molten mass is lowered at a speed greater than a few tens of degrees per minute, as is the case in general when the mass is allowed to cool spontaneously, solidification takes place too rapidly for crystallization to occur, and a homogeneous glass is obtained.

According to one particularly advantageous embodiment of the method for obtaining a panel of anisotropic ceramic glass comprising electrically conducting acicular crystals enclosed in an insulating vitreous matrix, the panel having a high electrical conductivity in a direction perpendicular to its faces and a negligible conductivity in a direction parallel to its faces, the homogeneous composition prepared from the starting mixture of mineral compounds consists of the following oxides within the properties indicated below, the parts being expressed in moles:

| | |
|---|---|
| $BaO$ : | 25 to 34 |
| $SrO$ : | 0 to 10 |
| $TiO_2$ : | 28 to 36 |
| $SiO_2$ : | 16 to 30 |
| $Al_2O_3$ : | 3 to 8 |
| $Na_2O$ : | 0 to 5 |
| $P_2O_5$ : | 0 to 3 |
| $CaF_2$ : | 0 to 2 |
| $La_2O_3$ : | 1 to 7 |

The layer of homogeneous composition in the vitreous state in the shape and dimensions of the panel may be obtained in any suitable manner, for example, directly from the homogeneous mass originating from the fusion and homogenization of the initial mixture of mineral compounds, or by casting this mass so as to give it the shape of the panel and then cooling it fairly rapidly so that it solidifies as homogeneous glass.

The expression "working temperature" with reference to the glass is used in this Specification in the sense generally attributed to it in the technical field in question, i.e. the temperature at which the common logarithm of the glass viscosity (expressed in poises) is equal to 4. In general, in the case of compositions which may be considered for effecting the method according to the invention, the working temperature is of the order of 1000° to 1300° C. Any appropriate method may be used to establish the thermal gradient perpendicular to the faces of the composition layer, for example, the device described hereinafter may be used.

The accompanying drawings shown diagrammatically and by way of example a device which may be used for effecting the method according to the invention, a diagram representing the variation in temperature (thermal profile) of the layer of vitreous composition as a function of time when operating the method according to the invention (by way of comparison, the thermal profile obtained during operation of the method described in U.S. Pat. No. 3,758,705 is also shown in this latter diagram), and micrographic sections showing the structure of a glass panel manufactured by the method according to the invention and, for comparison, the structure of a glass panel manufactured by a similar method.

FIG. 1 is a diagrammatic section through the device prior to the operation in which the composition to be treated by the method according to the invention is brought to a temperature at least equal to its working temperature, this composition being in the form of a homogeneous vitreous layer of the dimensions of the panel to be obtained, and a thermal gradient is established perpendicular to its faces.

Figure 3:
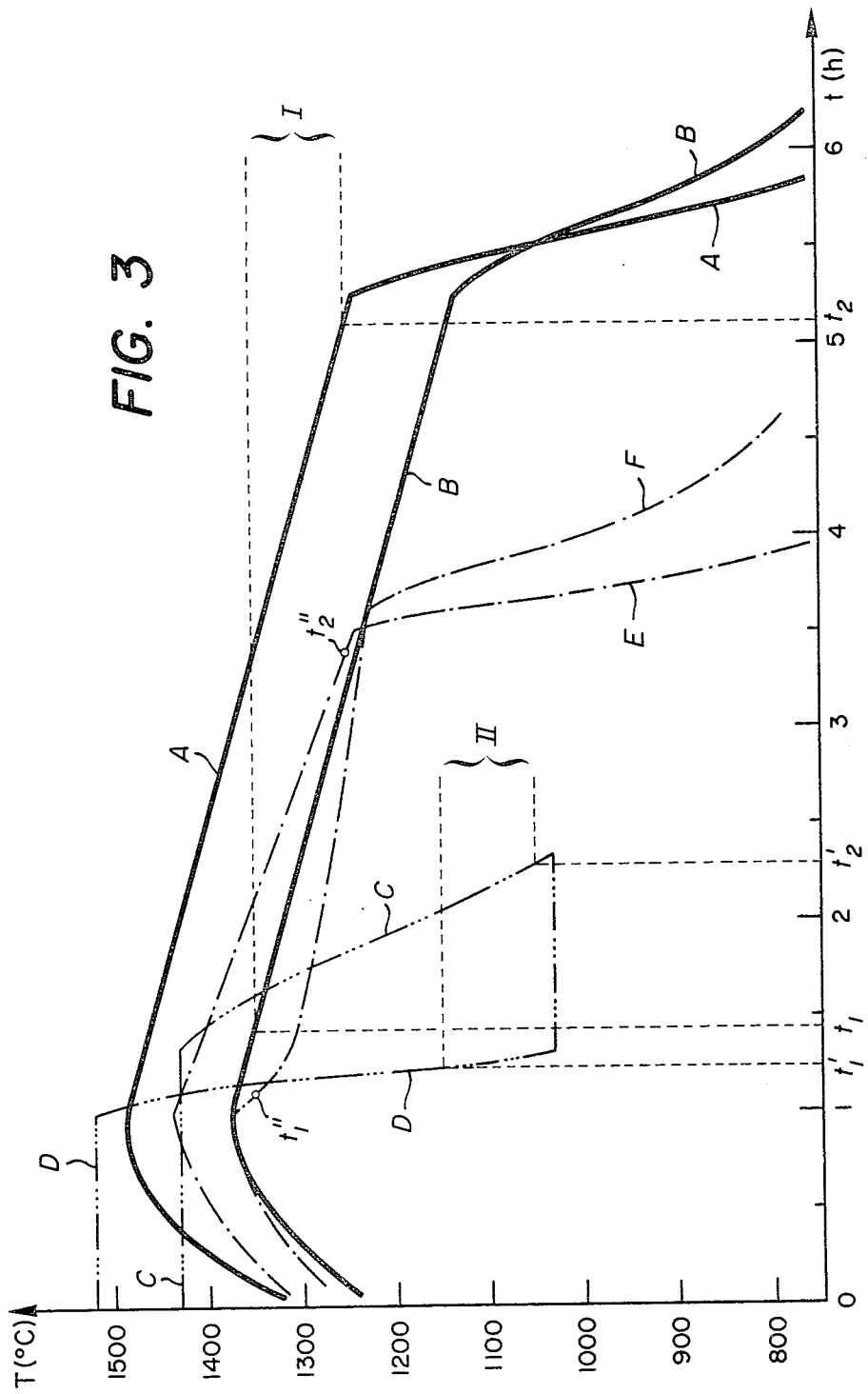
FIG. 3 is a diagram showing the variation in temperature of the layer of vitreous composition as a function of time during the effecting of the method according to the invention, under the conditions indicated hereinafter in Example 1.

FIG. 3 also shows a diagram representing the thermal profile obtained during the effecting of the method described in Example 2 of the U.S. Pat. No. 3,758,705, and also the thermal profile obtained by operating in a manner similar to the method according to the invention but without maintaining the thermal gradient constant.

Figure 4:
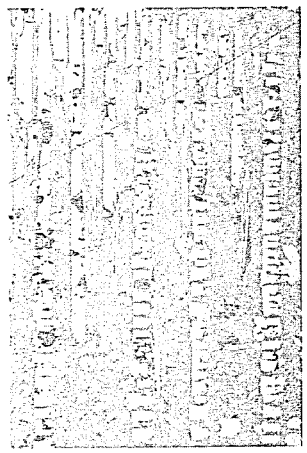
Figure 5:
Figure 6:
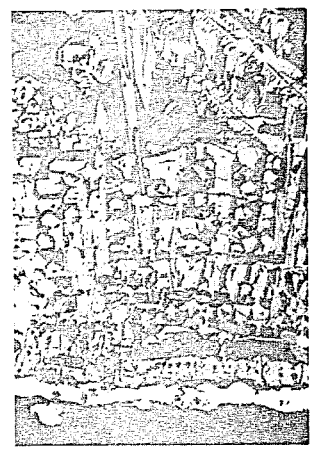

FIGS. 4, 5 and 6 are micrographic sections showing the structure of a glass panel manufactured by the method according to the invention.

Figure 7:
Figure 8:
Figure 9:
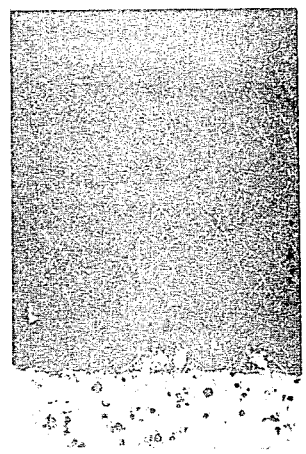

FIGS. 7, 8 and 9 are micrographic sections showing for comparison the structure of a glass panel manufactured by a method similar to that according to the invention.

Figure 1:
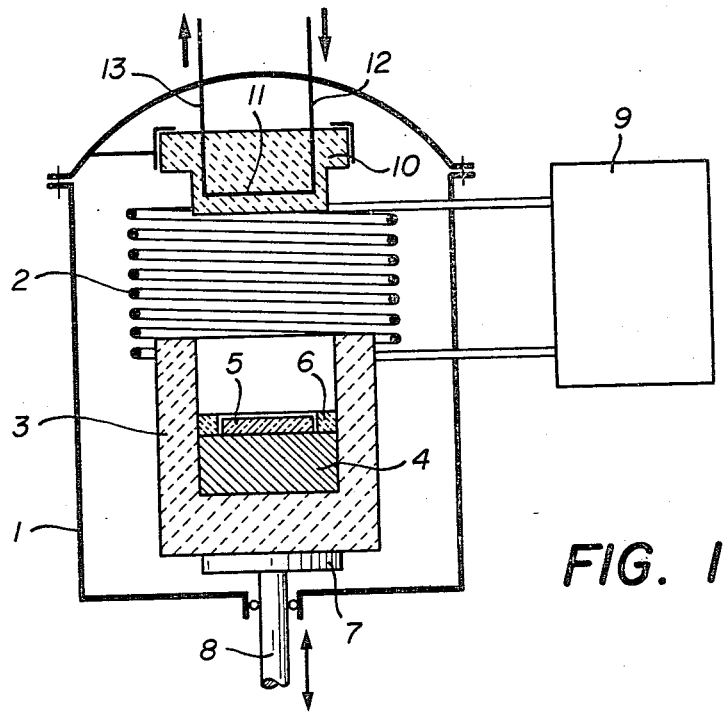
Figure 2:
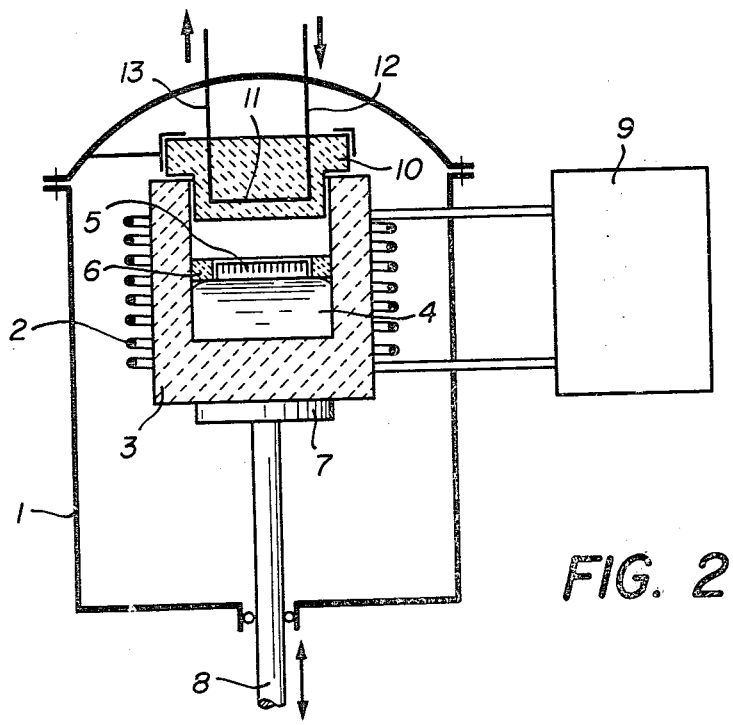
FIG. 2 is a diagrammatic section through the device during the operation in which the temperature of the composition is lowered from a temperature at least equal to its working temperature, so as to induce nucleation and growth of the crystalline phase.

The device shown in FIGS. 1 and 2 comprises a tight enclosure 1 provided with means, not shown on the drawing, to enable a vacuum to be obtained in the enclosure or to establish an inert gas atmosphere therein at a pressure equal or less than atmospheric pressure.

The enclosure 1 contains an induction coil 2 cooled by internal circulation of a suitable fluid, such as water, and connected to a high frequency electric current generator 9, so as to form an induction furnace.

A hollow graphite susceptor 3, likewise situated in the enclosure 1, forms a container holding a mass of metal 4 with a melting point lower than that of the glass, for example, pure tin, lead or a tin lead alloy, etc., on which the sample 5 of the composition to be treated by the method is placed. The sample 5 is kept in place by a graphite ring 6.

A mobile support 7 provided with a sliding rod 8 enables the susceptor 3 and its contents to be moved at will from the position shown in FIG. 1 to the position shown in FIG. 2 and vice versa, without prejudicing the tightness of the enclosure 1.

In the position shown in FIG. 1, the susceptor 3 is external to the coil 2 so that its contents are not heated by induction. The metal mass 4 is then in the solid state and the sample 5 is in the homogeneous vitreous state.

A graphite block 10 of such a shape and size as to enable it to fit into the opening in the susceptor 3 in the manner of a cover or plug (see the position shown in FIG. 2) and provided with an internal cooling circuit 11 using the circulation of a suitable fluid such as air or water (fed to and discharged from the circuit 11 by suitable conduits 12 and 13 in the manner indicated diagrammatically by the arrows) enables the temperature of the upper free surface of the sample 5 to be controlled.

In the position shown in FIG. 2, the susceptor 3 is internal to the coil 2 and its contents are heated by induction. The metal mass 4 is in the molten state and the sample 5 is subjected to a thermal gradient between a temperature $T_1$ at its upper free face and a temperature $T_2$, greater than $T_1$, at the molten metal mass 4.

Preferably, while the susceptor 3 is being induction heated by the coil 2 (FIG. 2), the interior of the enclosure 1 is under vacuum or under an inert gas atmosphere, for example, under an argon atmosphere.

EXAMPLE 1

A glass is prepared having the following composition (expressed in molar percentage):

| | |
|---|---|
| BaO : | 27.2 |
| SrO : | 7.0 |
| TiO$_2$ : | 34.4 |
| SiO$_2$ : | 20.6 |
| Al$_2$O$_3$ : | 3.5 |
| Na$_2$O : | 3.5 |
| P$_2$O$_5$ : | 2.0 |
| CaF$_2$ : | 1.8 |
| La$_2$O$_3$ : | 2.5 |

This is obtained by starting from a homogeneous mixture of the oxides indicated above in the powdered state, in the appropriate proportions (however instead of the oxide Na$_2$O, the carbonate Na$_2$CO$_3$ is used in a quantity corresponding to the correct proportion of Na$_2$O), and melting the mixture by heating to 1550° C. in a platinum crucible. The molten vitreous mass obtained in this manner is kept at this temperature for four hours to ensure that the mass is properly homogeneous, and is then rapidly cast into a flat bottom graphite mould in the form of a layer of 8 millimeters thickness. The layer is left to solidify by spontaneous cooling to atmospheric temperature, over about three hours. In this manner a homogeneous glass panel is obtained.

A disc 10 centimeters in diameter cut from this panel is placed in a device identical to that shown in the accompanying drawing, the susceptor 3 being in the position shown in FIG. 1 (in the device the disc occupies the position shown by the reference numeral 5). The metal mass 4 consists of pure tin.

An argon atmosphere at atmospheric pressure is established in the enclosure, a high frequency current is passed through the coil 2 and the susceptor 3 is gradually moved upwards to bring it into the position shown in FIG. 2, with the support 7 rising at a speed such that the temperature of the lower face of the disc 5 is raised from 20° to 400° C. in one hour, and then from 400° to 1300° C. in 30 minutes, and finally from 1300° to 1485° C. in one hour (the heating power is progressively increased over the same time).

When the susceptor 3 is in the extreme position shown in FIG. 2 and the temperature of the lower face of the disc 5 reaches 1485° C. (the temperature of the mass of tin 4 being likewise 1485° C.) the glass disc 5 is then in the plastic state, its lower face in contact with the molten tin being at the same temperature as this latter (1485° C.)) and its upper free face being at 1375° C. Between these two faces, there is thus established a thermal gradient having a value of 137.5° C. per centimeter perpendicular to the said faces. The heating power is then reduced so that the mass of tin 4 cools at a constant cooling speed of 0.96° C. per minute until its temperature reaches 1240° C.

Simultaneously, the graphite block 10 is cooled at a controlled cooling speed such that the temperature of the free surface of the disc 5 likewise falls at a constant cooling speed of 0.96° C. per minute, until it reaches 1130° C., so that the value of the thermal gradient perpendicular to the faces of the disc remains constant at 137.5° C. per centimeter.

During this stage of the procedure, the disc 5 progressively solidifies starting from its upper free face, into a panel of ceramic glass comprising acicular crystals with a diameter of the order of 50 microns, lying perpendicular to the disc faces and enclosed in a vitreous matrix, the average distance between two neighboring crystals being of the order of 50 to 100 microns. The nucleation of these crystals commences from the free face of the disc when its temperature is 1350° C. The crystals grow progressively towards the opposite face of the disc (in contact with the tin bath 4) and they reach the latter when its temperature has likewise fallen to 1250° C.

When the temperature of the tin bath is 1240° C., the heating current to the inductor 2 is switched off and the susceptor 3 and its contents cool to ambient temperature in about three hours.

The crystals are identified as consisting of barium titanate BaTiO$_3$ by X-ray diffractometry.

The electrical resistivity of the panel is 40 Ohm. cm in a direction perpendicular to the panel thickness, and $10^7$ Ohm. cm parallel to its faces.

Curve A of FIG. 3 shows the variation in temperature of the lower face of the vitreous composition layer, i.e. the face in contact with the metal bath, as a function of time during the operation of the method as described. The abscissa represents the time in hours and the ordinate the temperature in degrees centigrade.

Curve B of FIG. 3 shows the variations in temperature of the free upper face of the vitreous composition layer as a function of time. The crystallization range of the crystalline phase (upper limit approximately 1350° C., lower limit approximately 1250° C.) is shown by the bracket indicated by the reference numeral I.

It can be seen that at commencement of growth of the crystalline phase (at time $t_1$) the temperature of the upper face of the vitreous composition layer is 1350° C. and the temperature of its lower face is 1460° C. The thermal gradient is 137.5° C. per centimeter. At the end of longitudinal crystal growth of the crystalline phase (at time $t_2$), the temperature of the upper face of the layer is 1140° C. and the temperature of its lower face is 1250° C. The thermal gradient is still 137.5° C. per centimeter.

The thermal gradient of 137.5° C. per centimeter is maintained constant throughout the entire duration (from $t_1$ to $t_2$) of growth of the crystalline phase.

Curve C of FIG. 3 shows the variation with time of the surface temperature of the vitreous composition mass during operation of the method described in Example 2 of U.S. Pat. No. 3,758,705, curve D of this figure showing the temperature variation in the bottom of the mass.

The crystallization range of the crystalline phase (reduced) rutile), the upper limit of which is of the order of 1150° C. and the lower limits is of the order of 1050° C. (as shown in FIG. 2 of U.S. Pat. No. 3,758,705), is shown by the bracket indicated by the reference numeral II.

It can be seen that at commencement of growth of the crystalline phase (time $t'_2$), the temperature of the bottom of the vitreous composition mass is 1150° C. and the temperature of the surface of the mass is 1450° C.

At the moment in which the rutile crystals reach the surface of the mass (end of longitudinal crystal growth, time $t'_2$), the temperature of the bottom of the vitreous composition mass is 1030° C. and the temperature of the surface of the mass is 1050° C.

The temperature difference between the bottom of the vitreous composition mass and its surface is therefore not maintained constant throughout the duration of growth of the crystalline phase, this temperature difference being 280° C. at the beginning and 20° C. at the end of longitudinal crystal growth, and reaching a maximum value of 400° C.

The structure of the panel manufactured in the manner described in Example 1 is shown in FIGS. 4, 5 and 6.

These figures are micrographic sections taken in a plane perpendicular to the panel faces, and magnified 33 times.

FIG. 4 shows the structure obtained in the upper surfaces (free surface) region of the panel on thermal crystallization treatment, the top of the figure corresponding to said surface.

FIG. 5 shows the structure obtained in the central region of the panel.

FIG. 6 shows the structure obtained in the neighborhood of that surface of the panel in contact with the tin bath on thermal crystallization treatment, the bottom of the figure corresponding to said surface.

It can be seen from FIG. 4, 5 and 6 that the crystals (which correspond to the light parts, the vitreous matrix corresponding to the dark parts) are orientated perpendicularly to the faces of the panel, from one face to the other thereof.

EXAMPLES 2 to 4

The procedure is analogous to that described in Example 1, but using glasses of the composition indicated in the accompanying Table I.

The operating conditions and results obtained are indicated in the accompanying Table II.

TABLE I

| EXAMPLE 2 (proportions by molecular percentage) | | EXAMPLE 3 (proportions by molecular percentage) | | EXAMPLE 4 (proportions by molecular percentage | |
|---|---|---|---|---|---|
| SrO | 25.0 | BaO | 30.4 | $MnO_2$ | 20.0 |
| $TiO_2$ | 30.0 | $TiO_2$ | 30.0 | $TiO_2$ | 2.5 |
| $La_2O_3$ | 5.0 | $La_2O_3$ | 2.6 | $Fe_2O_3$ | 17.5 |
| $SiO_2$ | 30.0 | $SiO_2$ | 22.6 | $Al_2O_3$ | 6.0 |
| $Al_2O_3$ | 4.5 | $Al_2O_3$ | 3.8 | $SiO_2$ | 45.0 |
| $Na_2O$ | 4.5 | SrO | 4.5 | $B_2O_3$ | 4.0 |
| $P_2O_5$ | 1.5 | CaO | 2.5 | $Li_2O$ | 5.0 |
| | | $Na_2O$ | 3.6 | | |

TABLE II

| | EXAMPLE 2 | EXAMPLE 3 | EXAMPLE 4 |
|---|---|---|---|
| Melting point of oxide mixture (°C.) | 1500 | 1450 | 1450 |
| Homogenisation time in molten state | 6 hours | " | " |
| Heating speed of homogeneous glass disc 20° C. to 400° C. | 1 hour | " | " |
| 400° C. to maximum temperature (T°C.) | T = 1500; 30 min. | T = 1450; 30 min. | T = 1450; 30 min. |
| Temperature at commencement of crystal nucleation: | | | |
| Lower face (°C.) | 1400 | 1300 | 1200 |
| Upper face | 1200 | 1150 | 900 |
| Temperatures at end of crystal growth: | | | |
| Lower face (°C.) | 1180 | 1150 | 900 |
| Upper face (°C.) | 980 | 1000 | 600 |
| Cooling speed during crystal growth (°C. per minute) | 2 | 1 | 1 |
| Thermal gradient between panel faces during crystal growth (°C. per cm.) | 400 | 300 | 600 |
| Electrical resistivity of panel: Perpendicular to its thickness (Ohm.cm.) | 0.01 | 40 | 60 |
| Parallel to its faces | $10^6$ | $10^8$ | $10^4$ |

TABLE II-continued

| | EXAMPLE 2 | EXAMPLE 3 | EXAMPLE 4 |
|---|---|---|---|
| (Ohm.cm.) | | | |
| Nature of crystalline phase (identified by X-ray diffractometry) | $(Sr,La)TiO_3$ | $(Ba,La)TiO_3$ | $Mn(Fe,Ti)_2O_4$ |

EXAMPLE 5 (comparative)

A glass panel is prepared using the same initial vitreous composition as in Example 1 and proceeding in a manner similar to that described therein.

However, instead of controlling the cooling speed of the upper free surface of the disc 5 to a constant value equal to the cooling speed of the surface in contact with the molten tin bath, this former surface is allowed to cool spontaneously by dispensing with the use of the graphite block 10 (the opening of the susceptor 3 is left uncovered).

The variations in temperature of that face of the disc 5 in contact with the tin bath 4 is shown in this case by curve E of FIG. 3, and the variation in temperature of the upper free face of the disc 5 is shown by curve F of FIG. 3.

The thermal gradient between the faces of the disc 5 is 100° C. per centimeter at the commencement of crystallization (point $T''_1$ on curve F) and approximately 22° C. per centimeter at the end of crystallisation (point $t''_2$ on curve E).

The panel structure thus obtained is shown in FIGS. 7, 8 and 9, which represent micrographic sections analogous to those of FIGS. 4 to 6.

FIG. 7 shows the structure obtained in the surface region of the panel, commencing at that surface in the upper position on crystallization treatment.

FIG. 5 shows the structure obtained in the central region of the panel.

FIG. 9 shows the structure obtained in the neighbourhood of that surface of the panel in contact with the tin bath on crystallization treatment.

It can be seen from FIGS. 7, 8 and 9 that the crystals are orientated perpendicularly to the panel faces in the surface region in the neighbourhood of the upper free surface during crystallization treatment (FIG. 7), but that this orientation is less marked in the central region (FIG. 8) and is totally non-existent in the region in contact with the tin bath during crystallization treatment (FIG. 9).

This comparative examples demonstrates the importance of maintaining the thermal gradient at a constant and sufficiently high value throughout the entire duration of growth of the crystalline phase to obtain acicular crystals perpendicular to the faces of the panel throughout the entire thickness thereof.

We claim:

1. A method for manufacturing a panel of anisotropic ceramic glass comprising acicular crystals enclosed in a vitreous matrix, the acicular crystals being orientated perpendicularly to the panel faces and traversing the panel from one face to the other, comprising the steps of:

(a) preparing a homogeneous plate of a homogeneous mineral composition capable of forming a ceramic glass comprising a crystalline phase and a vitreous phase from a mixture of mineral oxides and mineral compounds capable of generating such oxides or a mixture of mineral compounds capable of generating such oxides, said plate being in vitreous state and having the shape and dimensions of the panel to be obtained, (b) placing said plate of vitreous composition on the surface of and in contact with a molten metal bath consisting of a metal or alloy of a melting point lower than the melting point of said mineral composition, said molten metal bath being provided with heating means for heating said bath to a desired temperature whereby said placing brings the lower face of said plate in contact with said bath to the same temperature, (c) providing cooling means for cooling said plate from above said plate and employing said cooling means to bring an upper face of said plate which is free from contact with said molten metal to a temperature below said desired temperature for said bath, (d) and monitoring and controlling said respective heating and cooling means, so as firstly to bring the whole plate to a temperature at least equal to its working temperature and above the crystallization temperature range of the crystalline phase, while bringing the upper face of said plate to a temperature lower than that of a lower face in contact with the bath surface to establish a temperature gradient perpendicular to said faces, the whole of said temperature gradient remaining above said crystallization temperature range, and then to simultaneously decrease the temperature of the two faces of said plate to effectively maintain said temperature gradient essentially constant throughout the entire growth of the crystalline phase, said temperature decrease being continued until the whole of the température gradient is brought below said crystallization temperature range, to effect nucleation of the crystalline phase first in the upper face and acicular crystals to then grow downwards according to a planar growth front in the direction of the lower face until said lower face is reached, and the direction of maximum growth of the crystals thus formed being perpendicular to the faces of the panel throughout its whole thickness, whereby said panel of ceramic glass is formed.

2. The method as claimed in claim 1, wherein said cooling means is constituted by a graphite block provided with an internal cooling circuit.

* * * * *